(12) United States Patent
Dieleman

(10) Patent No.: US 9,157,608 B2
(45) Date of Patent: Oct. 13, 2015

(54) DAMPENER

(75) Inventor: Martin John Edmond Dieleman, Lilydale (AU)

(73) Assignee: AURALIGHT INTERNATIONAL AB, Karlskrona (SE)

( * ) Notice: Subject to any disclaimer, the term of this patent is extended or adjusted under 35 U.S.C. 154(b) by 0 days.

(21) Appl. No.: 13/638,569

(22) PCT Filed: Mar. 29, 2011

(86) PCT No.: PCT/SE2011/050354
§ 371 (c)(1),
(2), (4) Date: Nov. 30, 2012

(87) PCT Pub. No.: WO2011/123036
PCT Pub. Date: Oct. 6, 2011

(65) Prior Publication Data
US 2013/0077325 A1  Mar. 28, 2013

(30) Foreign Application Priority Data
Apr. 1, 2010 (AU) .................. 2010901402

(51) Int. Cl.
*B60Q 1/00* (2006.01)
*F21V 15/04* (2006.01)
*F16F 7/00* (2006.01)
*F21V 19/00* (2006.01)
*H01R 33/975* (2006.01)

(52) U.S. Cl.
CPC . *F21V 15/04* (2013.01); *F16F 7/00* (2013.01); *F21V 19/00* (2013.01); *H01R 33/9753* (2013.01); *Y10T 29/49826* (2015.01)

(58) Field of Classification Search
CPC . F21V 15/04; H01R 33/9651; H01R 33/9753
USPC ..................... 362/369, 376, 377, 95
See application file for complete search history.

(56) References Cited

U.S. PATENT DOCUMENTS

| 2,208,155 | A | * | 7/1940 | Daehler | 362/548 |
| 2,529,279 | A | | 11/1950 | Breisch | |
| 2,724,770 | A | * | 11/1955 | Onksen, Jr. | 362/369 |
| 3,582,637 | A | * | 6/1971 | Cecil, Jr. | 362/581 |
| 3,599,169 | A | | 8/1971 | Detch | |

(Continued)

FOREIGN PATENT DOCUMENTS

| CN | 201396728 Y | 2/2010 |
| EP | 0 920 091 A2 | 6/1999 |
| WO | WO 97/27042 A1 | 7/1997 |

OTHER PUBLICATIONS

Office Action in corresponding Chinese Application No. 201180015976.0, dated Aug. 20, 2014.

*Primary Examiner* — Jong-Suk (James) Lee
*Assistant Examiner* — Bryon T Gyllstrom
(74) *Attorney, Agent, or Firm* — Knobbe, Martens, Olson & Bear, LLP

(57) ABSTRACT

A dampener configured to augment the mounting of a lamp in a socket by resisting displacement of the lamp relative to the socket. The dampener is made from a material able to absorb vibrations and to reduce or prevent vibrations in the lamp. The dampener is made in one piece or more pieces, wherein each piece is interposable in whole or in part between the socket and the lamp base to insulate the lamp in whole or part against the vibration translated through the socket or surrounding air.

6 Claims, 5 Drawing Sheets

(56) References Cited

U.S. PATENT DOCUMENTS

| | | | | |
|---|---|---|---|---|
| 4,423,471 A | * | 12/1983 | Gordin et al. | 362/96 |
| 4,437,145 A | | 3/1984 | Roller et al. | |
| 4,665,470 A | * | 5/1987 | George, Jr. | 362/236 |
| 4,967,328 A | * | 10/1990 | Tatavoosian | 362/267 |
| 5,067,065 A | * | 11/1991 | Dahlgren | 362/369 |
| 5,463,541 A | * | 10/1995 | Greene | 362/369 |
| 5,765,941 A | * | 6/1998 | Vest | 362/260 |
| 6,183,106 B1 | | 2/2001 | Thummel et al. | |
| 6,877,709 B2 | * | 4/2005 | March et al. | 248/549 |
| 7,220,024 B1 | * | 5/2007 | Berends | 362/217.08 |
| 7,329,017 B2 | * | 2/2008 | Walker | 362/3 |
| 7,452,112 B2 | * | 11/2008 | Arlon | 362/369 |
| 2006/0067076 A1 | * | 3/2006 | Shiang et al. | 362/288 |
| 2006/0158889 A1 | * | 7/2006 | McKenney | 362/369 |

* cited by examiner

DAMPENER

FIELD OF INVENTION

This invention relates to a dampener according to the preamble of claim 1. More particularly, this invention relates to an annular ring or band. More particularly, this invention relates to an annular ring for use as an anti-vibration device. Still more particularly, this invention relates to an anti-vibration annular ring for use in a lamp assembly. The invention also relates to a method according to claim 7.

BACKGROUND ART

The following references to and descriptions of prior proposals or products are not intended to be, and are not to be construed as, statements or admissions of common general knowledge in the art. In particular, the following prior art discussion does not relate to what is commonly or well known by the person skilled in the art, but assists in the understanding of the inventive step of the present invention of which the identification of pertinent prior art proposals is but one part.

A complete lighting unit or luminaire may include a lamp bulb or tube combined with a bayonet or screw-in base to form a lamp unit, a lamp holder to receive the lamp base to electrically connect the lamp to the holder, a protective transparent or translucent cover encasing the lamp and holder and connectors to a power source. Although the prior art and the invention will generally be described with reference to street lighting, it will be appreciated that the invention has applicability in relation to other applications in the fields of heavy transport, rail, mining and industry. Street lighting typically includes a lamp comprising a high or low pressure sodium lamp tube and a screw-in base. The screw-in base is made according to standards used, whereas in the US an E39 39 mm screw-in base is used according to local standards. In Australia, the European standards are adhered to, although given the closeness in dimensions, the US E39 39 mm screw-in base is effectively interchangeable in most Australian street lamp fittings.

In street lighting, in standard arrangements the lamp unit is inserted into a porcelain lamp holder that houses a metal threaded (female) socket providing the axial and cylindrical wall electrical contacts. The axial contact is typically spring loaded to improve the reliability of the axial contact and to provide engagement of the base under tension in the holder socket. However, in the street lighting environment and other lamp applications where low frequency vibrations are part of the operating environment, there is a tendency for the screw-in base to unthread by the combined action of the low frequency vibrations and the spring loaded centre contact. The loosening and unthreading of the screw-in base by axial displacement away from the spring loaded centre contact ultimately may open up a gap between the respective axial terminals leading to a condition in which arcing and discharge can occur. Arcing may lead to failure of the luminaire as a result of damage to the lamp holder, holder mounting and metal socket, so that simple replacement of the lamp unit will not repair the luminaire. Instead, considerable man hours, optionally use of expensive equipment such as cherry pickers, repair of damage to the porcelain lamp holder mounting and replacement of both the lamp holder and the lamp unit are normally required.

High quality, long life high pressure sodium lamps are available and are preferred unit components for many applications due to the potential for long-life and the reduction in maintenance and repair costs. However, the early occurrence of the loosening of the screw-in base can and does lead to, arcing and damage to the luminaire. Such damage is often caused by welding of the metal contacts of the lamp and lamp holder together due to the heat from discharge caused by the arcing. This significantly reduces the advantages offered by the use of long-life lamp technology.

It is noted that it becomes difficult to remove lamps that have failed as a result of arcing as often the heat welds the metal contacts of the lamp and lamp holder together. Moreover, the porcelain base of the lamp holders may be irretrievably damaged and difficult to remove. What should be a routine matter of replacement of a lamp becomes a major repair job to replace the lamp holder as well as repairing any damage to the holder mount.

Accordingly, a significant issue associated with optimising the life of industrial and transport lighting is the need to ameliorate the effects of low frequency vibrations on the screw engagement of the base in the socket.

Such low frequency vibrations are wholly or partially absorbed by the dampening device. The device, when in the form of the annular ring may be mounted as a short sleeve on the shaft of the screw-in base. Preferably, the annular ring is pushed or rotated around the thread up the screw-in base until it abuts the base of the tube, so that the annular ring forms a seal or gasket at the upper end of the socket and the screw-in base. The annular ring may therefore perform as a seal or gasket and thereby protect the socket against ingress of dust, grime and moisture, further preserving the socket and base against corrosion and other deterioration.

Efforts have been made to solve the problem of the loosening of the screw-in base by providing multiple wire spring formed in the internal wall of the female threaded socket in an attempt to hold the screw-in base in place against the spring loaded centre contact. However, whilst such arrangements may delay the damage occasioned by the unthreading of the screw-in base, unthreading still inevitably occurs well before the expected expiration of the life of the lamp tube.

An object of the present invention is to ameliorate the aforementioned disadvantages of the prior art to at least provide a useful alternative thereto.

STATEMENT OF INVENTION

This has been solved by the dampener defined in the introduction comprising the features of the characterizing part of claim 1.

Accordingly, in one aspect of the invention there is provided a dampener to augment the mounting of a lamp in a socket by resisting displacement of the lamp relative to the socket, the dampener made from material able to absorb vibrations and to reduce or prevent vibrations in the lamp, the dampener in one or more pieces, each piece interposable in whole or in part between the socket and the lamp base to insulate the lamp in whole or part against the vibration translated through the socket or surrounding air.

The dampener may be one or more small inserts. Where multiple inserts are used, there are preferably three or more and the inserts are preferably equispaced about the screw-in base. Equispacing may be achieved by a rigid or resilient annular band connecting each inset. Alternatively, the dampener may be in the form of an annular ring or band.

In a another aspect, there is provided an annular ring to augment the mounting of a lamp in a socket by resisting displacement of the lamp relative to the socket, the annular ring made from one or more non-deformably resilient materials including a generally cylindrical body having a cylinder length shorter than the cylinder body's diameter, the cylinder body having a cylinder wall wherein the thickness of the cylinder wall is greater at a first end of than the thickness of the wall at a second end of the cylinder body.

In another aspect, there is provided a lighting assembly including a lighting assembly including:

A lamp holder housing a metal socket;

A lamp mountable in the socket; and

An annular ring interposable between the lamp and the socket, the annular ring configured to augment the securement of the lamp in the socket, the annular ring made from one or more non-deformable resilient materials including a generally cylindrical body having a cylinder length shorter than the cylinder body's diameter, the cylinder body having a cylinder wall wherein the thickness of the cylinder wall is greater at a first end of the cylinder body and tapers towards a second end of the cylinder body to facilitate insertion and securement in the socket.

This has also been solved by a method of assembling a lighting assembly according to claim 7.

Preferably, the lighting assembly comprises:

A lamp holder housing a metal socket;

A lamp having a shaft insert able in the socket; and an annular ring made from one or more non-deformable resilient materials including a generally cylindrical body having a cylinder length shorter than the cylinder body's diameter, the cylinder body having a cylinder wall wherein the thickness of the cylinder wall is greater at a first end of the cylinder body and tapers towards a second end of the cylinder body.

The method including the steps of:

Mounting the annular ring onto the shaft so that the tapered second end is oriented towards the free end of the shaft and the thick first end is oriented towards a light portion of the lamp;

Inserting the shaft into the socket so that the annular ring is compressed between the internal wall of the socket and the external wall of the shaft, the annular ring resisting displacement of the lamp relative to the socket.

The lighting assembly may be used in a variety of applications, such as industrial environments where low frequency vibration machinery is used, including mining or factory environments. The lighting assembly may be a street lighting assembly whereby the lighting assembly is exposed to low frequency vibration sources such as may be generated by large diesel engines. Lighting used at railway nodes such as stations and crossings may also use lighting assemblies made according to the present invention.

The lamp holder may be made using a variety of materials such as ceramic, polymer and combinations or composites of these materials, depending on the expected operation temperatures and exposure to wear and tear. In the context of street lighting, high pressure sodium lamps operate at relatively high temperatures (e.g. 250-300° C.) and accordingly, high melting point materials, such as ceramic materials are most suitable for forming the holder body.

The metal socket is preferably a substantially cylindrical sleeve, the internal wall of which has a thread corresponding to the thread of the screw-in base. The metal thread socket may include means to better grip the screw-in base and to resist axial displacement of the base away from the centre contact. The metal threaded socket may optionally include resiliently depressible wire springs formed in the wall of the socket and adapted to press against the screw-in base in engagement to better grip and hold the screw-in base under tension. However, it is noted that whilst this arrangement may absorb the effect of low frequency vibrations to some extent, on their own the wire spring arrangement is insufficient to ensure that the screw-in base remains correctly placed in the socket. As is standard in the art, the axial contact may comprise a spring loaded centre contact, but the corollary of this standard arrangement is that it produces an undesirable axial force that tends to urge the screw-in base to move in an unthreading rotational direction which, combined with exposure to vibration forces, may lead to a gap opening up between the spring loaded axial contact and the lamp's axial terminal.

The lamp may include a range of lamp types, such as high and low pressure sodium incandescent lamps suitable for mining, street lighting and other transport applications. Possible lamp types also include standard incandescent lamps (tungsten filaments), quartz halogen lamps, fluorescent lamps, etc. Preferably, the lamp is a high intensity discharge (HID) lamp and, still more preferably, a high intensity sodium lamp. The tube is typically made of clear quartz or ceramic and may be enclosed in an outer glass envelope. The tube may house typically one or two elements and be manufactured to specifications for relatively long-life of 12 to 24 months.

The typical HID lamp operates at higher temperatures in the range of about 250-300° C. Therefore, metal fatigue over time is a factor, when combined with the effects of mechanically wearing vibrations, at the point of greatest weakness, namely the spring loaded centre contact of the socket. However, the life of the spring loaded centre contact can extend beyond that of the socket itself if the lamp unscrews even a little to form a gap between connecting electrical contacts. In this situation, arcing may occur, thereby running the risk of burning out the lamp base and the centre contact. Accordingly, metal fatigue of the centre contact is a lesser issue than the propensity of the lamp to unscrew in use.

Preferably the central bore of the annular ring is of consistent diameter throughout its length. The internal bore may be threaded using the same gauge as the thread of the screw-in base. However, for ease of manufacture, the internal bore is preferably a plane cylindrical bore. The tapering of the outer ring wall may be linear in side plan view or may be curved to fit snugly around the upper wall and rim of the socket, so that at least a portion of the annular ring is neatly compressed against the socket. This may be effective to absorb vibrations communicating to the lamp through the luminarie, including the protective casing surrounding the lamp assembly, as well as the surrounding environment through which percussive vibrations may affect the lamp unit.

The annular ring is preferably made from high temperature silicone or high temperature rubber or polymer material, or a combination or composite of one or more of the foregoing. For example, the annular ring may comprise a composite in which the upper thicker wall of the first end comprises harder, more resilient material, whereas the tapered, second end comprises a layer of softer material better adapted to absorb vibrations. Alternatively, the annular ring may comprise an inner layer of harder material overplayed by an outer layer of softer, more vibration-absorbent material. Different combinations or choices of materials may be used to suit different environments, depending on the type, intensity of and frequency of vibrations to which the luminaries will be subjected in use. Notwithstanding this, to conserve manufacturing costs, the annular ring is moulded from a homogonous silicone rubber material having a high melting point.

BRIEF DESCRIPTION OF THE DRAWINGS

The invention may be better understood from the following non-limiting description of preferred embodiments, in which schematically.

DETAILED DESCRIPTION OF THE DRAWINGS

Preferred features of the present invention will now be described with particular reference to the accompanying drawings. However, it is to be understood that the features illustrated in and described with reference to the drawings are not to be construed as limiting on the scope of the invention.

Figure 1:
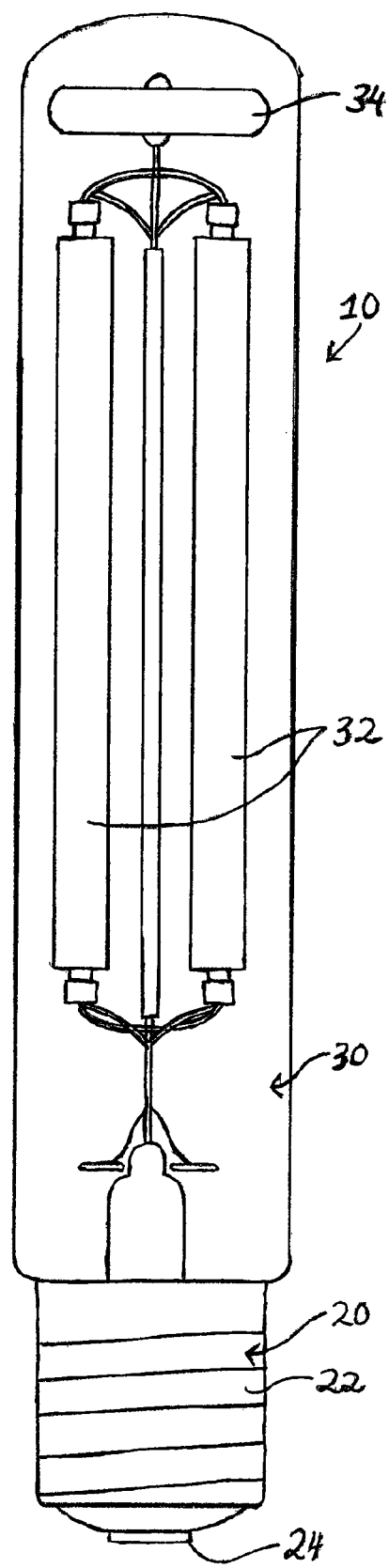
FIG. 1 is a side elevation of a lamp according to one embodiment.
Figure 2:
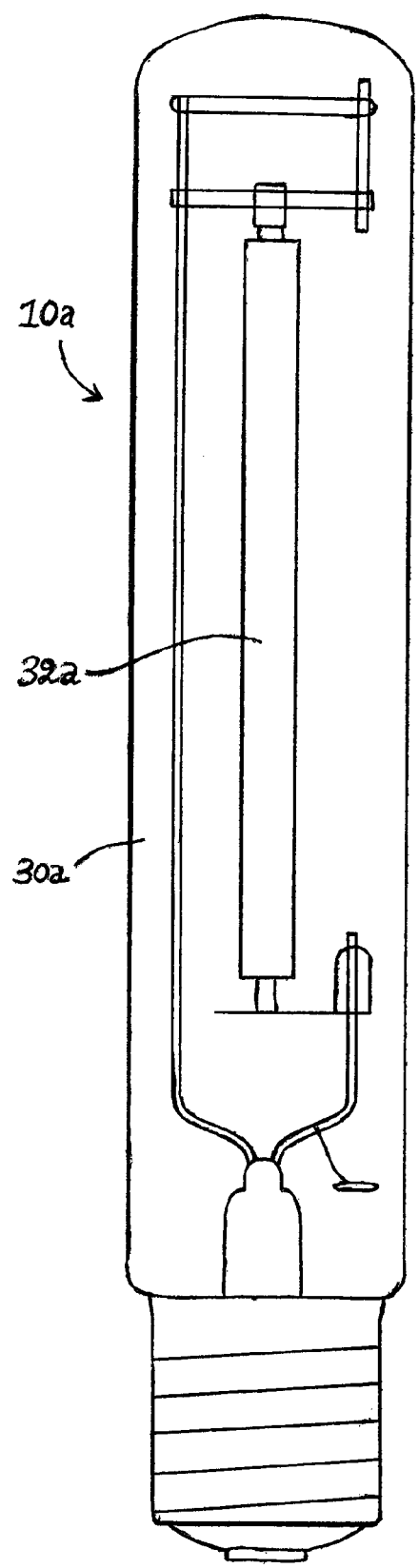
FIG. 2 is a side plan view of a lamp according to a second embodiment.

Referring to FIG. 1, there is shown a lamp 10 in the form of an HID high pressure sodium lamp having a screw-in base 20 and tube 30. The screw-in base 20 includes a side wall electrical contact 22 formed from the threaded wall of the screw-in base and an axial contact 24 at the screw-in bases 23 and 23a. The tube 30 houses a pair of incandescent sodium elements 32 which are suspended centrally in the tube 30 by metal wire and plate structures 34. The lamp 10a shown in FIG. 2 is similar to the lamp 10 shown in FIG. 1, with the exception that the tube 30a houses only a single sodium incandescent element 32a.

Figure 3:
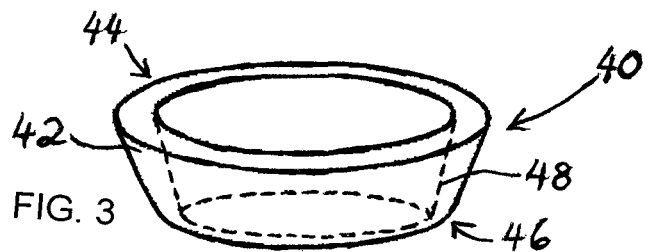
FIG. 3 is perspective view of an annular ring according to one embodiment of the present invention.

In FIG. 3, there are shown an annular ring made from a high temperature silicon or rubber material. The annular ring 40 comprising a body having a frusta-conical shape wherein the wall thickness of the body 42 is greater at a first, upper end 44 and tapers towards a second end 46 at which the wall 42 thickness is considerably smaller than at the first end 44. The broken lines 48 indicate the shape of the internal ball that also defines a frusta-conical cavity. The shape of the frusta-conical bore 48 facilitates the mounting of the annular ring 40 as a sleeve onto the screw-in base 20, whilst the narrow diameter of the bore 48 at the second end ensures a tight fit about the screw-in base 20. The tapering of the wall 42 towards the second end 46 allows the annular ring 40 to sit nearly within the lip of a lamp holder socket as will be described below.

Figure 4:
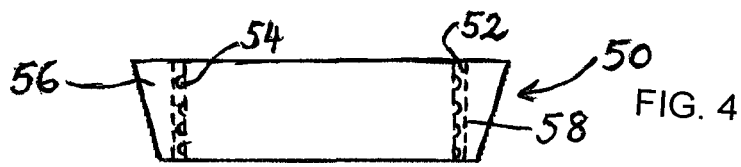
FIG. 4 is a side plan view of an annular ring according to another embodiment of the present invention.

Turning to FIG. 4, there are shown an annular ring 50 that is externally also frusta-conical in shape, but has a cylindrical bore 58 of constant diameter throughout its length. The annular ring 50 is made from a combination of materials, comprising a more rigid silicon internal layer 52 optionally having threaded grooves 54 to correspond to the screw-in base 20 flights. Whilst the internal layer 52 provides rigidity, a softer, more vibration-absorbent outer layer 56 is provided that is adapted to compress between the socket and the screw-in base 20 to act as an effective dampener material.

Figure 5:
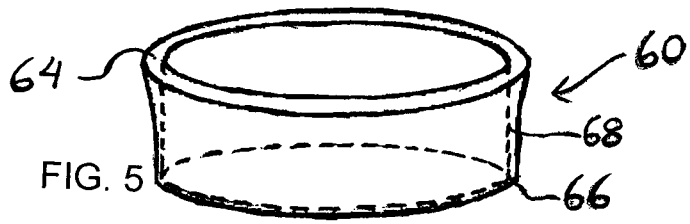
FIG. 5 is a perspective view of an annular band according to another embodiment of the invention.
Figure 6:
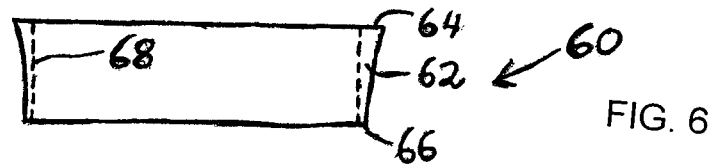
FIG. 6 is a side plan view of the annular band shown in FIG. 5.
Figure 7:
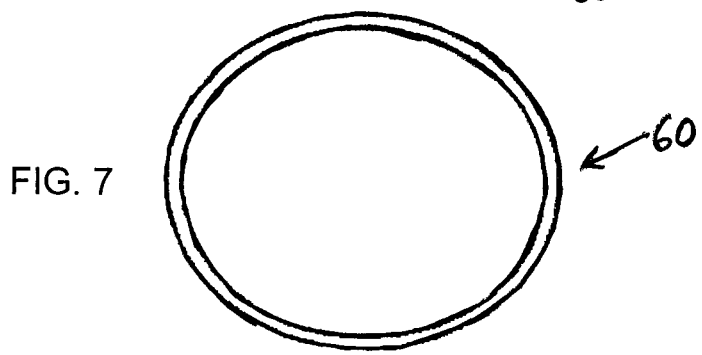
FIG. 7 is a top plan view of the annular band shown in FIGS. 5 and 6.

FIG. 5 shows an annular band 60 that has an internal cylindrical bore 68 and an external wall 62 that curvaceously tapers from an upper thick end 64 down to a tapered second end 66. The curved tapering of the wall 62 facilitates the neat insertion of the lower end 66 into the upper end of the socket for a neat fit, whilst the thickened flared upper end 64 flares outwardly to correspond to the radically outwardly extending lip of the socket at its upper end. FIGS. 6 and 7 provide a clearer view of the annular band 60 from a side elevation perspective (FIG. 6) and a top plan view (FIG. 7).

Figure 8:
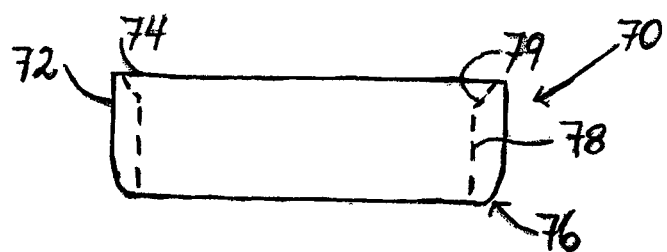
FIG. 8 is a side plan view of an annular band according to another embodiment.

In FIG. 8, there are shown an annular band 70 including a substantially cylindrical bore 78 that flares outwardly 79 at its upper end 74 to enable the annular cavity formed by the flare 79 to neatly accommodate the lower most end of the tube 30. The external wall 72 is substantially cylindrical and constant throughout most of its length, except that the lower end 76 is inwardly tapered or rounded to enable neat insertion into the upper end of the socket.

The following table provides a non-limiting guide to the technical specifications for the properties of the dampener material that will be suitable in many applications of the dampener:

| TECHNICAL SPECIFICATIONS FOR DAMPENER MATERIAL | | | | | |
|---|---|---|---|---|---|
| PROPERTY | ASTM ... | DIN ... | VALUE | WO49/TO50 | RO89 |
| Hardness | D 2240 | 5305 | °SHORE A | 60° (+/−5°) | 60° (+/−5°) |
| Specific Gravity Density | D 297 | 53479 a | GR/CM$^3$ | 1.17 | 1.28 |
| Tensile Strength | D 412 | 53504-S1 | KG/CM$^3$ | 80 | 75 |
| Elongation @ Break | D 412 | 53504-S1 | % | 350 | 300 |
| Tear Strength | D 624 B | | KN/M or N/MM or KG/CM | 20 | 17 |
| Compression Set (22 hrs @ 177° C.) | D 395 B | 53517 | % | 32 | 30 |
| Thermal Conductivity | | | | 0.330 to 0.515 × 10$^0$ GR-CAL/SEC/CM$^3$/CN/°/C | |
| Temperature Range | | | | −60° to +200° C. (Continuous) +250° C. (Intermittent) | |

| TECHNICAL SPECIFICATIONS FOR DAMPENER MATERIAL | | | | | |
|---|---|---|---|---|---|
| PROPERTY | ASTM . . . | DIN . . . | VALUE | WO49/TO50 | RO89 |
| Specifications: | ALL SILICONE SHEETS CONFORM TO BS: EN; 2260; 1995 and FDA REGULATIONS FDA 21 CFR 177.2600 W049 WHITE IS APPROVED TO 'WRC' HOT & COLD DRINKING WATER REQUIREMENTS NO. 9811508 | | | | |
| Thickness: | 0.3, 0.5, 0.8, 1.0, 1.5, 2.0, 3.0, 4.0, 5.0, 6.0, 8.0, 10.0 mm | | | | |
| Roll Size: | All sized available in 10 mar long × 1.2 mar wide rolls Cut sizes & Shapes Available | | | | |

Figure 9:
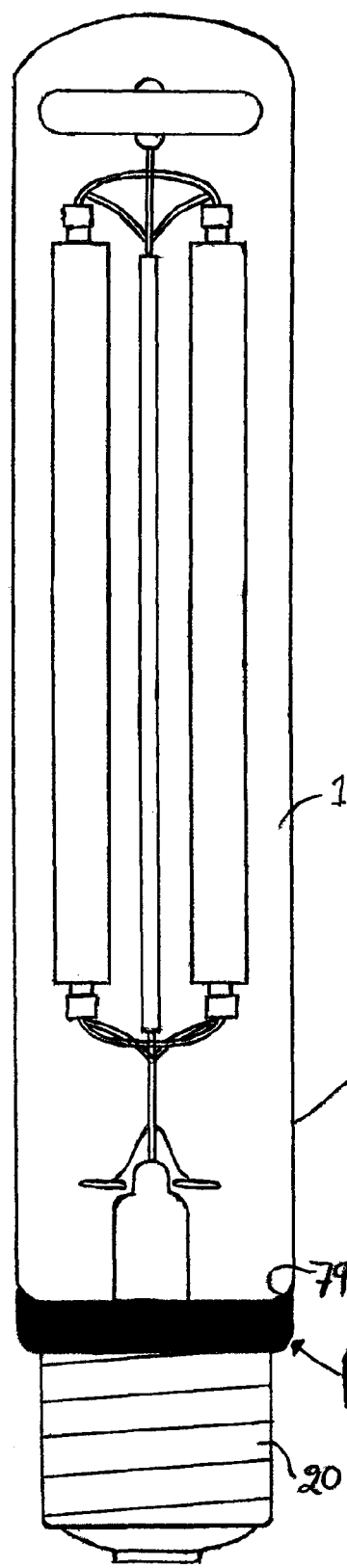
FIG. 9 is a side elevation of the lamp shown in FIG. 1 bearing the annular ring shown in FIG. 8.
Figure 10:
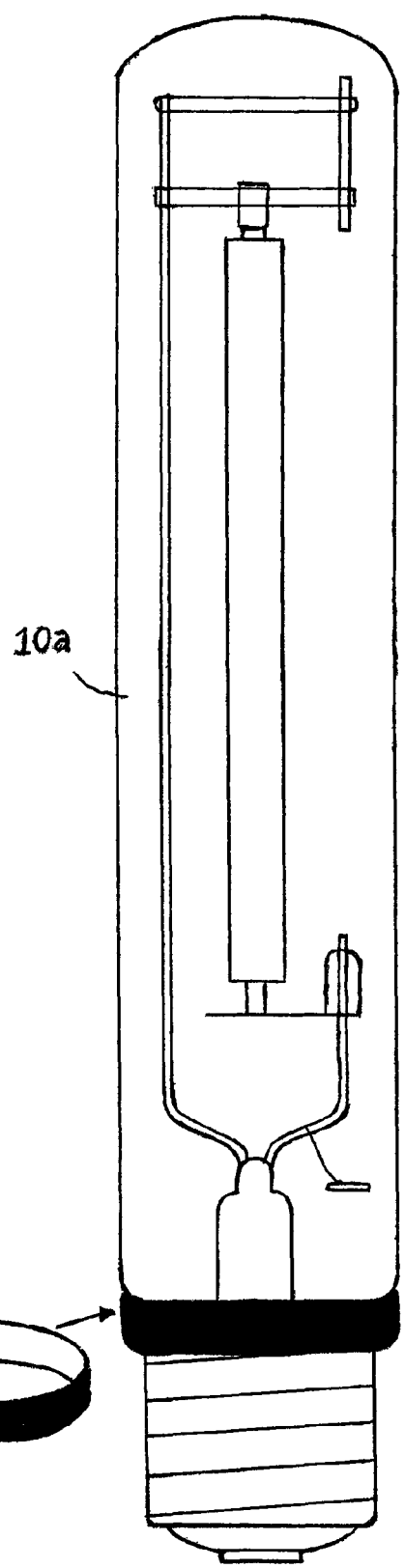
FIG. 10 is a side elevation of the lamp shown in FIG. 2 bearing the annular ring shown in FIG. 8.

In FIG. 9, there is shown the annular band 70 mounted onto the screw-in base 20 of the lamp 10. The annular band 70 is shown in schematic form wherein the upper end 74 is tapered to form an inner annular recess 79 that fits nearly about the curved wall at the base of the tube 30. A similar arrangement is shown in relation to the lamp 10a in FIG. 10.

Figure 11:
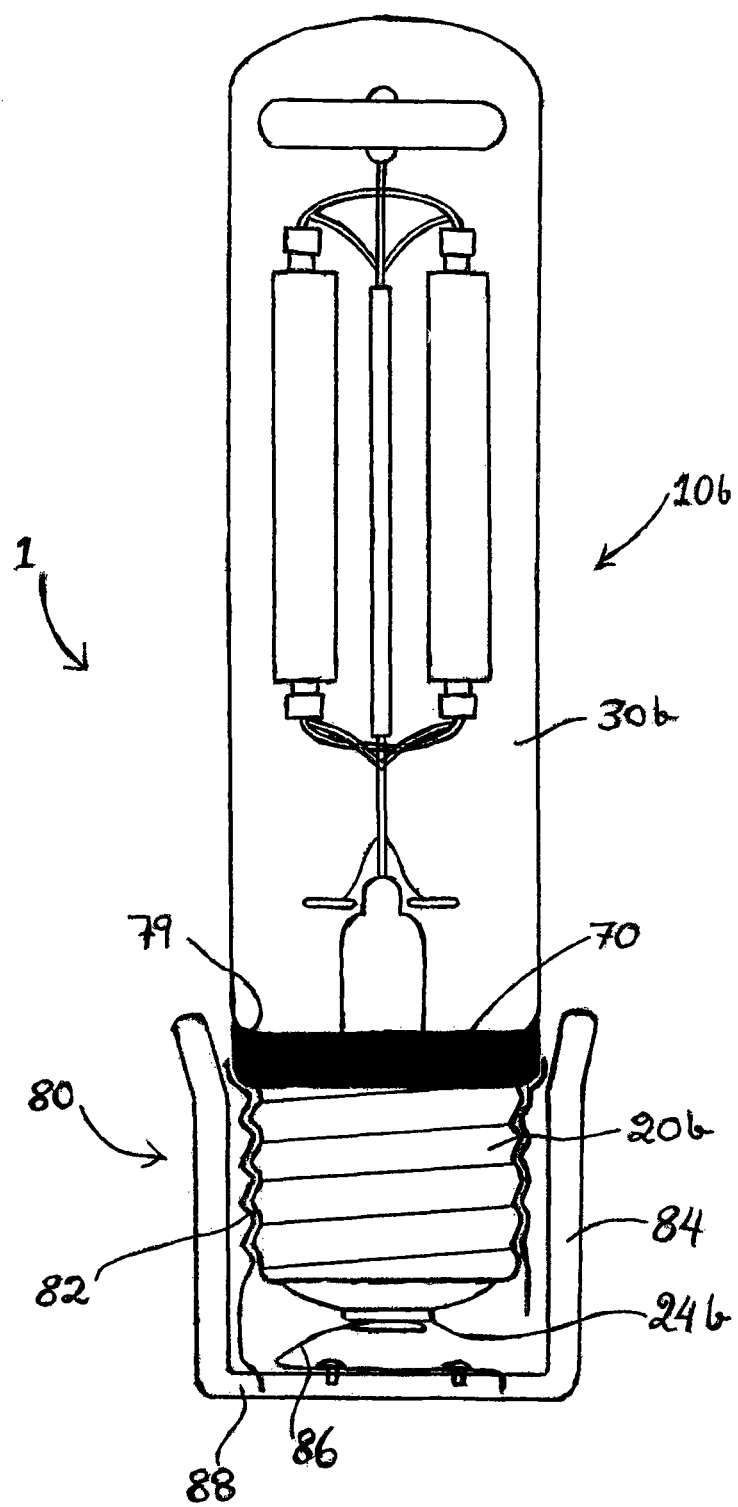
FIG. 11 is a side elevation of a lamp according to another embodiment mounted in a lamp holder.

With reference to FIG. 11, there is shown a lamp 10b being a shorter version of the dual-element lamp 10 shown in FIG. 1. An annular band 70 has been mounted as a sleeve onto the screw-in base 20b and slid or rotated up the shaft of the base until the upper recess 79 of the upper first end 74 of the annular band 70 abuts with the lower most portion of the curved lower wall of the tube 30b of the lamp 10b. The lamp 10 has then been screwed-in to a metal threaded socket 82 housed within a lamp holder 80 further including a porcelain outer body 84. The lamp holder 80 further includes a spring load centre contact 86 adapted to electrically connect the axial terminal 24b and the metal threaded socket 82 electrically connects to the side wall terminal of the screw-in base 20b in a manner standard in the art.

It will be appreciated that, in use, low frequency vibrations emanating from machinery such as heavy road transport subject the components of the lamp assembly 1 shown in FIG. 11 to vibration forces, both mechanically by translation through the lamp holder 80 body via the socket 82 to the screw-in base 20b and by vibrations through the air which tend to disrupt the engagement of the screw-in base 20b with the socket 82. Combined with the axial, upward force caused by the spring loaded centre contact 86, the lamp 10b tends to axial displacement away from the spring loaded centre contact 86. Even when the spring loaded centre contact 86 loses physical contact with the axial terminal 24b, the displacement effect of the vibration forces may still cause the lamp 10b to further axially displace away from the spring loaded centre contact 86, so that a gap of 1-3 mm may arise between the centre contact 86 and the axial terminal 24b. This situation provides the conditions whereby arcing discharge can occur between the axial terminal 24 and the centre contact 86, subjecting the component in and around the axial terminal 24b and the centre contact 86 to extremely high temperatures sufficient, in some situations, to weld the metal components together, thereby permanently damaging the overall assembly. Indeed, the force of such discharges may be sufficient to blow out the bottom 88 of the lamp holder 80 causing irretrievable damage to the lamp 80 and potentially the lamp holder mounting of the overall lamp support structure.

However, with the insertion of the annular band 70 interposed between the socket 82 and the screw-in base 20b, the vibration forces translated through the socket 82 are dampened to an extent sufficient to neutralise the disabling effect on the engagement of the socket 82 with the screw-in base 20b which would occur in the absence of the annular band 70. The tapering of the annular band 70 at its lower end 76 allows the socket 82 to neatly receive the annular band 70 in a tight, compressed fit whereby to resist rotation of the screw-in base 20b relative to the socket 82, thereby also resist axial displacement of the lamp 10b relative to the centre contact 86.

The lighting assembly 1 achieves the requisite industrial applicability by solving the problem of early failure of lamp units due to arcing resulting from displacement of the lamp from its socket holder.

According to the previous embodiments has been described:

A dampener to augment the mounting of a lamp in a socket by resisting displacement of the lamp relative to the socket, the dampener made from material able to absorb vibrations and to reduce or prevent vibrations in the lamp, the dampener in one or more pieces, each piece interposable in whole or in part between the socket and the lamp base to insulate the lamp in whole or part against the vibrations translated through the socket or surrounding air, an annular ring to augment the mounting of a lamp in a socket by resisting displacement of the lamp relative to the socket, the annular ring made from one or more non-deformable resilient materials including a generally cylindrical body having a cylinder length shorter than the cylinder body's diameter, the cylinder body having a cylinder wall wherein the thickness of the cylinder wall is greater at a first end of the cylinder body and tapers towards a second end of the cylinder body.

A lighting assembly including a lamp holder housing a metal socket; a lamp mountable in the socket; and an annular ring interposable between the lamp and the socket, the annular ring configured to augment the securement of the lamp in the socket, the annular ring made from one or more non-deformable resilient materials including a generally cylindrical body having a cylinder length shorter than the cylinder body's diameter, the cylinder body having a cylinder wall wherein the thickness of the cylinder wall is greater at a first end of the cylinder body and tapers towards a second end of the cylinder body to facilitate insertion and securement in the socket.

A method of assembling a lighting assembly, the lighting assembly including: A lamp holder housing a metal socket; a lamp mountable in the socket; and an annular ring made from one or more non-deformable resilient materials including a generally cylindrical body having a cylinder length shorter than the cylinder body's diameter, the cylinder body having a cylinder wall wherein the thickness of the cylinder wall is greater at a first end of the cylinder body and tapers towards a second end of the cylinder body.

The method including the steps of: Mounting the annular ring onto the shaft so that the tapered second end is oriented towards the free end of the shaft and the thick first end is oriented towards a light portion of the lamp; inserting the shaft into the socket so that the annular ring is compressed between the internal wall of the socket and the external wall of the shaft, the annular ring resisting displacement of the lamp relative to the socket.

Figure 12A:
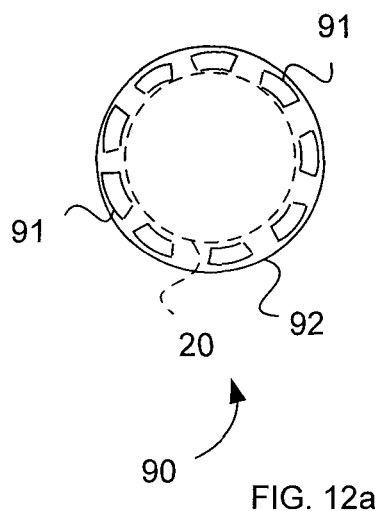
FIGS. 12a and 12b are views of a sixth embodiment.
Figure 12B:
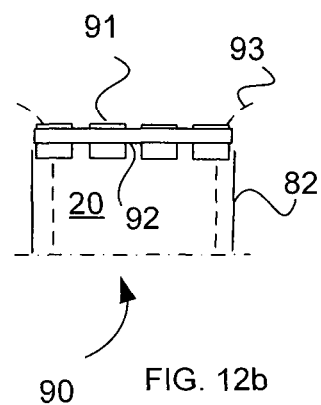

FIGS. 12a and 12b are views schematically illustrating a sixth embodiment of the dampener 90 made of a material able to absorb vibrations and to reduce or prevent vibrations the lamp. In this case the material comprises neoprene. The socket 82 of the lamp engages the individual pieces 91 of the dampener 90. A holding ring 92 holds the pieces 91 of neoprene. Each piece is thus interposable in whole or in part between the socket 82 and the lamp base 93 and shaft 20 to insulate the lamp in whole or in part against the vibrations translated through the socket 82 or surrounding air. Each piece 91 is also interposable partially between the socket 82 and the shaft 20 of the lamp.

Figure 13:
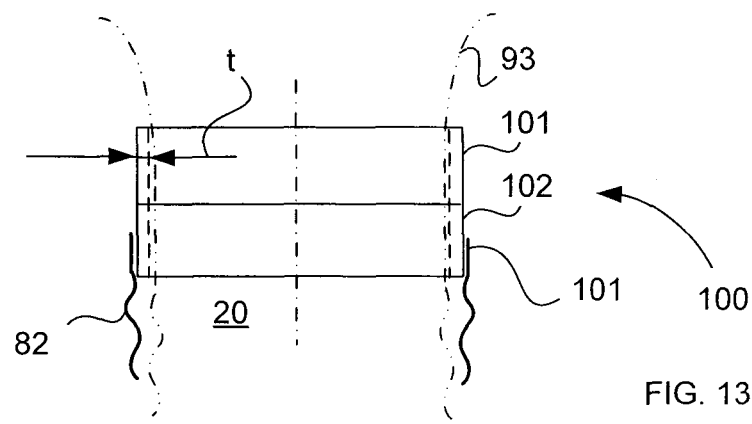
FIG. 13 is a view of a seventh embodiment.

FIG. 13 shows schematically a seventh embodiment where the dampener 100 is made in two pieces 101, 102 of cork, the pieces are joined via fasteners (not shown). The pieces 101, 102 are annular shaped and each piece has a constant thickness. The thickness t is such that the outer and inner cylindrical surface of the respective piece easy will snugg against the upper part of the socket 82 and lamp base 93. The pieces are made of heat resistant rubber.

Figure 14:
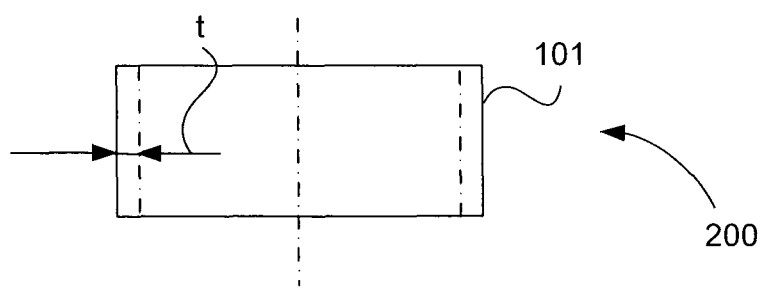
FIG. 14 is a view of an eighth embodiment.

FIG. 14 shows schematically a dampener 200 according to an eighth embodiment wherein the dampener 200 being constructed of one cylindrical piece 101. The thickness t of the dampener's 200 wall is constant for achieving the dampening fitting as presented in FIG. 13 and the wall thickness t is such that the outer and inner cylindrical surface of the dampener 200 will snug against the upper part of the socket and lamp base.

Throughout the specification and claims the word "comprise" and its derivatives are intended to have an inclusive rather than exclusive meaning unless the contrary is expressly stated or the context requires otherwise.

That is, the word "comprise" and its derivatives will be taken to indicate the inclusion of not only the listed components, steps or features that it directly references, but also other components, steps or features not specifically listed, unless the contrary is expressly stated or the context requires otherwise.

Orientational terms used in the specification and claims such as vertical, horizontal, top, bottom, upper and lower are to be interpreted as relational and are based on the premise that the component, item, article, apparatus, device or instrument will usually be considered in a particular orientation, typically with the [H] uppermost.

It will be appreciated by those skilled in the art that many modifications and variations may be made to the methods of the invention described herein without departing from the sprit and scope of the invention.

The invention can be described in terms of provisional claims that can assist the skilled reader in understanding the various aspects and preferments of the invention. However, these provisional claims are not to be construed as defining statements of the invention. It will be appreciated that other forms, aspects and preferred features of the invention and its embodiments described herein may ultimately be included in the claims defining the invention in the specifications of complete, international or national applications (or their subsequent corresponding patent grants) that may claim priority from the provisional application accompanying this specification. In this context, the following non-limiting claims assist to better describe the invention:

The invention claimed is:

1. A lighting assembly comprising:
   a lamp holder housing a metal socket, the metal socket comprising a cylindrical sleeve comprising an internal wall comprising a metal thread, wherein the metal socket comprises resiliently depressible wire springs formed in the wall of the metal socket;
   a lamp comprising:
      a lamp base comprising a screw-in base comprising a thread corresponding to the metal thread of the internal wall of the metal socket configured to come into electrical contact with the metal socket, wherein the resiliently depressible wire springs formed in the wall of the metal socket are adapted to press against the lamp base and hold the lamp base under tension, and
      a bulb; and
   a dampener, said dampener consisting of a generally cylindrical body in the shape of an annular ring that comprises an upper portion configured to accommodate the lower most end of the bulb, and a lower portion configured to fit snugly within an upper end of the metal socket, wherein the cylindrical body has a cylinder wall thickness that is tapered towards one end of the cylindrical body, wherein the tapered end is configured to be oriented towards the lower most end of the bulb, wherein the dampener augments the mounting of the lamp in the metal socket by resisting displacement of the lamp relative to the metal socket, wherein the dampener is made from a material able to absorb low frequency vibrations and to reduce or prevent vibrations in the lamp, and wherein the dampener is configured to be interposable in whole or in part between the upper end of the metal socket and the lower most end of the bulb, thereby forming a seal between the upper end of the metal socket and the screw-in base of the lamp and insulating the lamp in whole or part against the vibrations translated through the metal socket or surrounding air.

2. The lighting assembly according to claim 1, wherein the dampener is made from one or more non-deformable resilient material(s).

3. The lighting assembly of claim 1, wherein said material of the dampener comprises a high temperature silicone or rubber material.

4. A method of assembling a lighting assembly comprising:
   providing a lamp comprising:
      a lamp base comprising a screw-in base comprising a thread, and
      a bulb,
   providing a metal socket comprising a cylindrical sleeve comprising an internal wall comprising a metal thread corresponding to the thread of the screw-in base of the lamp, wherein the metal socket further comprises resiliently depressible wire springs formed in the wall of the metal socket adapted to press against the lamp base and hold the lamp base under tension, and
   providing a dampener consisting of a generally cylindrical body in the shape of an annular ring that comprises an upper portion configured to accommodate the lower most end of the bulb, and a lower portion configured to fit snugly within an upper end of the metal socket, wherein the cylindrical body has a cylinder wall thickness that tapers towards one end of the cylindrical body, wherein the tapered end is configured to be oriented towards the lower most end of the bulb, wherein the dampener is configured to augment the mounting of the lamp in the metal socket by resisting displacement of the lamp relative to the metal socket, wherein the dampener is made from a material able to absorb low frequency vibrations and to reduce or prevent vibrations in the lamp, wherein the dampener is configured to be interposable in whole or in part between the upper end of the metal socket and the lower most end of the bulb, thereby forming a seal between the upper end of the metal socket and the screw-in base of the map, and insulating the lamp in whole or part against the vibrations translated through the metal socket or surrounding air;

mounting the dampener onto an external wall of the lower most end of the bulb; and inserting the lamp into the metal socket so that the dampener is compressed between an internal wall of the metal socket and the external wall of the lower most end of the bulb.

5. The method according to claim 4, wherein the annular ring is made from one or more non-deformable resilient material(s).

6. A lighting assembly comprising:

a lamp holder housing a metal socket, the metal socket comprising a cylindrical sleeve comprising an internal wall comprising a metal thread, wherein the metal socket comprises resiliently depressible wire springs formed in the wall of the metal socket;

a lamp comprising
 a lamp base comprising a screw-in base comprising a thread corresponding to the metal thread of the internal wall of the metal socket configured to come into electrical contact with the metal socket, wherein the depressible wire springs in the metal socket are adapted to press against a lamp base and hold the lamp base under tension, and
 a bulb; and a dampener, said dampener consisting of a generally cylindrical body in the shape of an annular ring that comprises an upper portion configured to accommodate the lower most end of the bulb, and a lower portion configured to fit snugly within an upper end of the metal socket, wherein the dampener augments the mounting of the lamp in the metal socket by resisting displacement of the lamp relative to the metal socket, wherein the dampener is made from a material able to absorb low frequency vibrations and to reduce or prevent vibrations in the lamp, wherein the dampener is configured to be interposable in whole or in part between the upper end of the metal socket and the lower most end of the bulb, thereby forming a seal between the upper end of the metal socket and the screw-in base of the lamp and insulating the lamp in whole or part against the vibrations translated through the metal socket or surrounding air.

* * * * *

UNITED STATES PATENT AND TRADEMARK OFFICE
CERTIFICATE OF CORRECTION

| | | |
|---|---|---|
| PATENT NO. | : 9,157,608 B2 | Page 1 of 1 |
| APPLICATION NO. | : 13/638569 | |
| DATED | : October 13, 2015 | |
| INVENTOR(S) | : Martin John Edmond Dieleman | |

It is certified that error appears in the above-identified patent and that said Letters Patent is hereby corrected as shown below:

In The Specification

In column 4 at line 56, Change "homogonous" to --homogeneous--.

In column 7 at line 5 (approx.), Change "W049" to --WO49--.

In column 9 at line 54 (approx.), Change "sprit" to --spirit--.

Signed and Sealed this
Twenty-sixth Day of April, 2016

Michelle K. Lee
*Director of the United States Patent and Trademark Office*